(12) United States Patent
Klein

(10) Patent No.: US 10,194,667 B2
(45) Date of Patent: Feb. 5, 2019

(54) CONTINUOUS BAKING SYSTEM

(71) Applicant: Jeffrey F. Klein, Glen Burnie, MD (US)

(72) Inventor: Jeffrey F. Klein, Glen Burnie, MD (US)

(*) Notice: Subject to any disclaimer, the term of this patent is extended or adjusted under 35 U.S.C. 154(b) by 68 days.

(21) Appl. No.: 15/194,424

(22) Filed: Jun. 27, 2016

(65) Prior Publication Data

US 2017/0290344 A1 Oct. 12, 2017

Related U.S. Application Data

(60) Provisional application No. 62/185,259, filed on Jun. 26, 2015.

(51) Int. Cl.
| | |
|---|---|
| *A47J 37/04* | (2006.01) |
| *A21C 11/00* | (2006.01) |
| *A21B 1/48* | (2006.01) |
| *A21B 1/14* | (2006.01) |

(52) U.S. Cl.
CPC .................. *A21B 1/48* (2013.01); *A21B 1/14* (2013.01); *A21C 11/006* (2013.01); *A47J 37/045* (2013.01); *A47J 37/044* (2013.01)

(58) Field of Classification Search
CPC ..... A47J 37/044; A47J 37/045; A21C 11/006; A21C 1/008
USPC ............... 99/349, 353, 443 C, 386, 391, 393
See application file for complete search history.

(56) References Cited

U.S. PATENT DOCUMENTS

| | | | | |
|---|---|---|---|---|
| 3,646,880 | A * | 3/1972 | Norris .................... | A47J 37/044 219/244 |
| 3,693,533 | A * | 9/1972 | Liepa ...................... | A23J 3/227 99/373 |
| 3,739,711 | A | 6/1973 | Nieblach | |
| 3,965,807 | A | 6/1976 | Baker | |
| 4,718,843 | A * | 1/1988 | Carlsson ................. | B30B 5/067 100/118 |
| 5,044,264 | A * | 9/1991 | Forney .................... | A47J 37/044 99/349 |
| 5,265,524 | A * | 11/1993 | Seletti ...................... | A21B 1/48 198/458 |
| 5,458,051 | A * | 10/1995 | Alden ..................... | A47J 37/044 198/626.5 |
| 5,918,533 | A * | 7/1999 | Lawrence ............... | A21B 5/03 425/310 |
| 8,151,695 | B2 | 4/2012 | Szymanski | |

* cited by examiner

*Primary Examiner* — Reginald L Alexander
(74) *Attorney, Agent, or Firm* — Royal W. Craig

(57) ABSTRACT

A continuous-belt baking system having a pair of upper rollers rotatably mounted in frame and spaced at a first distance, a pair of lower rollers rotatably mounted in frame and spaced at a second distance, a continuous thermally-conductive belt passing over the upper rollers, a continuous thermally conductive belt passing over the lower rollers, and two arrays of radiant heating elements. The radiant arrays include a first group of heating elements above a lower run of the upper belt between said upper rollers and a second opposing group of heating elements below an upper run of the bottom belt between the lower rollers. Each heating element may be separately controlled insofar as its ON/OFF state or in accordance with temperature, to provide more localized baking capabilities.

20 Claims, 1 Drawing Sheet

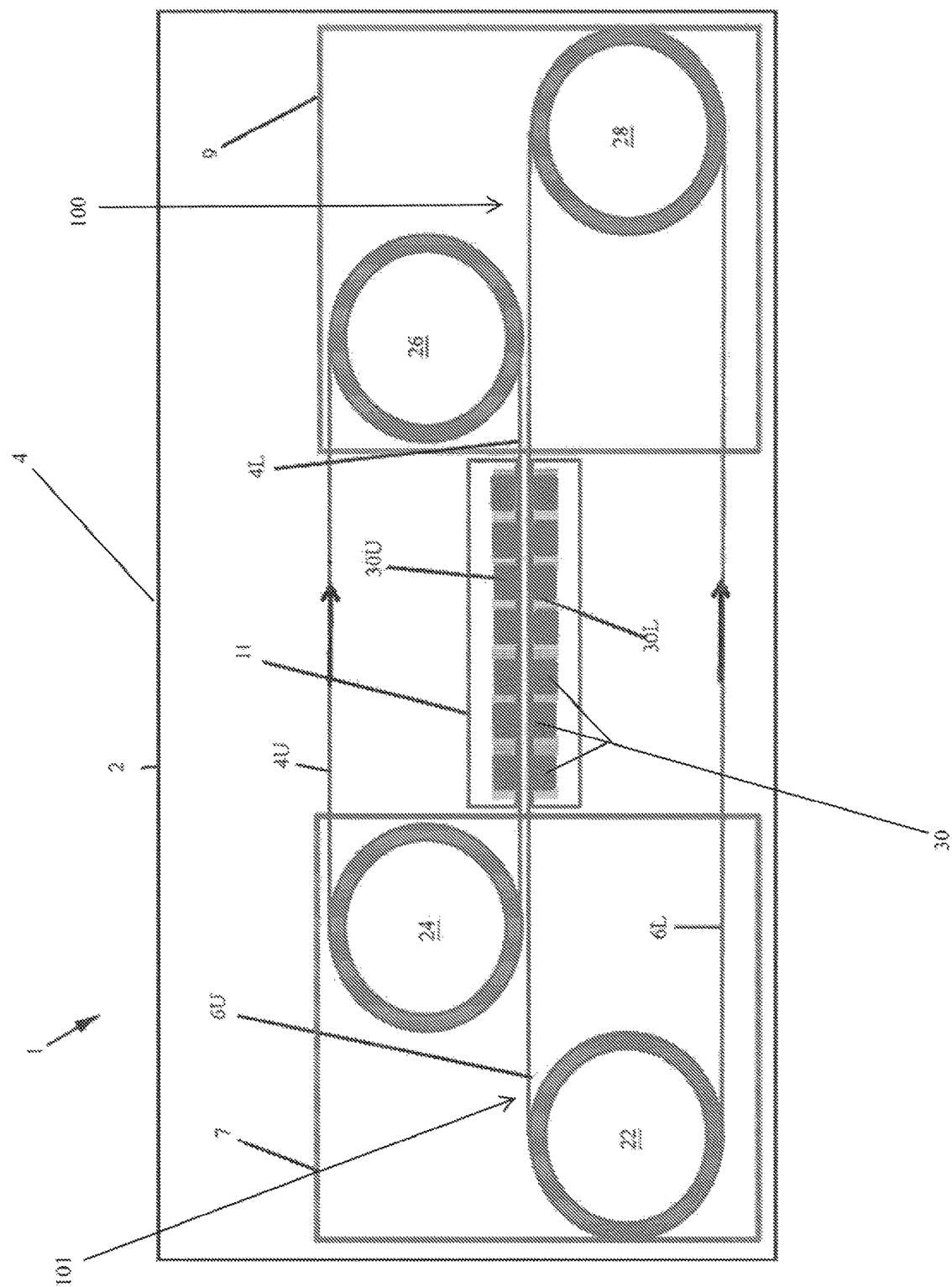

CONTINUOUS BAKING SYSTEM

CROSS-REFERENCE TO RELATED APPLICATION(S)

The present application derives priority from U.S. provisional application Ser. No. 62/185,259 filed 26 Jun. 2015.

BACKGROUND OF THE INVENTION

1. Field of the Invention

The present invention relates to commercial baking systems and, specifically to an improved baking system and process for continuously baking a continuously deposited stream of batter on a continuous belt for baking cookies and other food products.

2. Description of the Background

The domestic retail market for snack food exceeds $80 Billion annually, but many snack foods are considered unhealthy due to high sugar content, allergens, high sodium content, high fat content, etc. Consumers have shown a willingness to spend more for healthier snack foods. The need for preservatives can be reduced by choice of cooking process. For example, foods can be cooked under pressure in order to reach "commercial sterility", the condition achieved by application of heat which renders such food free of viable forms of microorganisms of public health significance, as well as any microorganisms of non-health significance capable of reproducing in food under normal storage conditions. It is not an easy proposition to apply pressure during commercial baking operations. One way is by belt-type cooking machines.

Belt-type cooking machines are known for cooking food products by the application of heat to the top and bottom of a food article to be cooked. Single-belt cooking machines run a continuous belt through overlapping heating elements to heat the top and bottom of the food along the run of the belt, as shown in U.S. Pat. No. 3,965,807 and U.S. Pat. No. 3,739,711. Double-belt cooking machines such as shown in U.S. Pat. No. 8,151,695 use upper and lower overlapping, thermally conductive belts that counter-rotate so that, in use, a bottom run of said upper belt and a top run of said lower belt co-operate to convey food to be cooked into said food products between said upper and lower belts.

The simultaneous application of heat to the top and bottom surfaces of the food whilst the food is sandwiched and conveyed between the counter-rotating belts is a far more efficient, inexpensive, and comparatively compact approach to commercial baking. It allows the combination of radiant heating and pressure application, reducing the need for preservatives, ultimately producing a lower calorie low-salt product. Unfortunately the '695 shows a periodic cooking process in which steps are performed and repeated for each food item.

It is an object of the present invention to employ a double-belt cooking machine in a fully-continuous baking process.

Double-belt cookers create other problems such as the entrapment of gases during cooking. Gases trapped in bubbles formed on the surface of the food, particularly from the top of the food, can cause disruption of the interior and surface structure of the food product as the bubbles burst out of the sides of the food. This causes an inferior non-uniform food product and a mess to clean up.

It is an object of the present invention to overcome, or at least substantially ameliorate, the disadvantages and shortcomings of the prior art.

BRIEF DESCRIPTION OF THE DRAWINGS

Other objects, features, and advantages of the present invention will become more apparent from the following detailed description of the preferred embodiment and certain modifications thereof, in which:

FIG. 1 is a side-view illustration of the hardware architecture of the continuous baking system according to the present invention.

DETAILED DESCRIPTION OF THE PREFERRED EMBODIMENT

The present invention is an improved baking system and process for baking certain kinds of foods such as cookies from liquid batter. The system employs two counter-rotating continuous moving belts forming a conveyor path. The upper belt is shorter than the lower belt, allowing a continuous deposition of a stream of raw batter on the cool surface of the lower belt. Both belts are thermally conductive, e.g., metallic belts moving about a pair of opposed rollers in a horizontal plane. An array of radiant heating elements is located centrally during the belt's travel immediately above the inside surface of the lower portion of the top belt and immediately below the upper inside surface of the bottom belt to provide a combination of radiant and pressure cooking. Heat from the heating elements is transmitted directly to the belts and to the food articles.

FIG. 1 is a schematic illustration of the automatic double-belt cooking system 1 according to the present invention. The automated cooking system 1 includes an upper continuous belt 4 mounted horizontally on spaced rollers 24, 26, and a lower continuous belt 6 mounted horizontally on spaced rollers 22, 28. The rollers 22-28 are rotatably mounted on four axles transversely in a main frame 2. This results in an upper run 4U of the upper continuous belt 4 and a lower run 4L, and an upper run 6U of the lower continuous belt 6 and a lower run 6L.

The upper rollers 22, 28 are aligned within a first horizontal plane and the lower rollers 24, 26 are aligned within a second horizontal plane, and the vertical spacing between roller pairs 22, 28 and 24, 26 is preferably adjustable. Rollers 22-28 may be either drums, cylinders or pulleys (with side flanges). Continuous belts 4, 6 are thermally conductive, preferably metal, and may optionally be coated with Teflon® or other suitable substance with non-stick properties to provide sufficient flexibility, high temperature resistance, thermal conductance, and non-stick characteristics to releasably support and bake batter. The upper belt 4 is preferably rotated in a clockwise direction over rollers 22, 28 while the lower belt 6 is preferably rotated counterclockwise over rollers 24, 26. As used herein, terms such as "clockwise" and "counterclockwise" indicate the direction (s) in which various elements of the instant invention travel when viewed from the side as depicted in FIG. 1, with rollers 24 and 22, proximate to output area 101, towards the left of the field of view and rollers 26, 28, proximate the batter deposition area 100, towards the right of the field of view. It will be understood that alternative configurations of rollers 22-28 and belts 4, 6, as well as directions of rotation and/or travel of each of rollers 22-28 and belts 4, 6 are possible, provided that the relative motion of the lower run 4L of upper belt 4 and the upper run 6U of lower belt 6 match to cooperatively carry batter through cooking system 1 and past heating elements 30U and 30L. In addition, it will be understood that upper belt 4 and lower belt 6 may be equal in length or have different lengths based on design choice and/or the desired connectability of the baking system to potential other pieces of equipment along the process chain. In a preferred embodiment, as shown in FIG. 1, lower belt 6 extends out beyond the length of upper belt 4 on both sides.

An array of radiant heating elements 30 includes a plurality of upper heating elements 30U spaced just above the lower run 4L of the upper belt 4 in a central location, and a plurality of lower heating elements 30L spaced just below the upper run 6U of the lower belt 6 in the same central location. The length of the central location extends between the upper roller 24, 26 and is the "cooking zone" 11. The radiant heat generated by the heating elements 30 within the cooking zone 11 is transferred directly to the respective belts 4, 6, and directly to the batter sandwiched there between.

The length of the cooking zone 11 may vary based on the overall length of belts 4, 6 as described herein, but is preferably between 30% and 90% of the length of the lower run 4L of upper belt 4 to allow a sufficient length of heating of the batter as it progresses through the cooking zone 11. It will be understood that the length of cooking zone 11 may vary based on the length of belts 4, 6, but also based on other characteristics of the cooking system 1 such as the angular momentum of rollers 22-28, the BTUs supplied by cooking zone 11 or by each individual heating element 30 therein, the type of batter being cooked using the system and/or the desired amount of cooking time for the specific application for which the system 1 is used. In addition, in preferred embodiments, cooking parameters such as the angular momentum of rollers 22-28, BTUs delivered by cooking zone 11 or by each individual heating element 30 therein, and the like may be actively controlled and adjusted by an operator of the system 1 actively during the continuous cooking process or on a periodic basis, such as when the system 1 is used for cooking different types of products on different days.

Moreover, although cooking zone 11 has been described herein as an "array of radiant heating elements 30" including a plurality of upper heating elements 30U spaced just above the lower run 4L of the upper belt 4 and a plurality of lower heating elements 30L spaced just below the upper run 6U of the lower belt 6, it will be understood that each of the upper and lower portions of cooking zone 11 may instead consist of a single, continuous heating element each formed into a single upper and a single lower unit, or that cooking zone 11 as a whole may comprise a single heating unit that wraps around the upper surface of the lower run 4L of belt 4, the lower surface of upper run 6U of lower belt 6, and around the edges of the lower run 4L of belt 4 and upper run 6U of belt 6 in a central area of belts 4, 6 to form an elongated hollow cylindrical shape. In alternative embodiments cooking zone 11 consists of an array of individual heating elements 30 as depicted in FIG. 1, wherein one or more individual heating elements 30 are adjustable such that they may be turned "on" or "off", or "up" or "down" in terms of their individual BTU output, at any point before, during or after the cooking process.

In use, a continuous line of dispensed batter is deposited onto continuous batter deposition area 100 on the upper portion 6U of lower belt 6 (i.e., on the offset right hand side of lower belt 6 as viewed in FIG. 1), and is conveyed on the upper run 6U of the lower belt 6 where is becomes sandwiched and compressed by encountering roller 26 and is continuously compressed by the pressure of bottom and top runs of belts 4, 6 pressing against each other. The batter is initially deposited on a cool belt portion but is quickly and continually exposed to heat from the radiant heating array 30 or other type of heating element in cooking zone 11 on both sides whilst it is sandwiched between the belts 4, 6, thereby flash-cooking the batter. As viewed in FIG. 1, the batter progresses from the right to the left sides of the page, or from continuous batter deposition area 100 to output area 101. The batter is fully cooked by the time it exits from between the belts 4, 6 at the downstream end of the system.

Upon arrival at output area 101 on the upper run 6U of lower belt 6, the cooked batter may be continuously processed in a variety of ways. In one embodiment, lower belt 6 at output area 101 may connect to one or more additional conveyor belts for transporting the cooked batter through one or more additional food processing systems, such as a system to cut shapes from the cooked batter product, a system to apply toppings and/or design elements to the cooked batter, a packaging operation, or the like. Alternately, the length of lower belt 6 may be extended, either by an extension of the horizontal distance between rollers 22, 28 or by extension of belt 6 itself and attachment of belt 6 to additional rollers (not shown) at a distal end thereof, whereby the additional length of belt 6 beyond output area 101 serves the purpose of transporting the cooked batter through the additional processing operations as described herein, provided that this addition of length to belt 6 does not alter the speed at which belt 6 travels through cooking zone 11 relative to upper belt 4.

In certain embodiments, the baking system may comprise a cooling element to cool those portions of the belt that are not actively involved in transporting and cooking dough, such as the upper run 4U of upper belt 4 or the lower run 6L of lower belt 6.

The belts 4, 6 move continuously, except for cleaning, repairs, or when the machine is shut down, with the facing surfaces moving at the same speed in the same direction.

In one preferred embodiment, the cooking system 2 is of modular construction, constructed in four modules. First, an intake module 9 may comprise its own separate housing enclosing upper roller 26 and a lower roller 28, each powered by the same variable speed motor. Second, an output module 7 may comprise its own separate housing enclosing two rollers 22, 24, but no motor, or if the output module 7 has a motor, no motor will be installed on the input module 9. It will be understood that motors could be installed on both the input and output modules as a matter of design choice provided that the drive motors in the combination of motor(s) installed are linked or otherwise synched to provide the same speed on both upper 4 and lower 6 belts. The third and fourth modules preferably comprise a lower cooking module 30L and a height adjustable upper cooking module 30U, which collectively contain all the radiant heating elements 30 and equipment and controls to vary the temperature of each heating module 30. As described above, each heating element may be separately controlled insofar as its ON/OFF state or in accordance with temperature, to provide more localized baking capabilities.

Intake, output, and third and fourth modules may be joined together by any known means, but are preferably joined in a releasable manner, e.g. nut and bolt, such that various modules may be interchangeable or able to be removed individually for cleaning and/or repair. For example, intake module 9 and output module 7 may be removed from a given configuration of the baking system and re-attached to different third and fourth modules that have longer belts and/or cooking areas, different voltages of heating elements, or the like. Alternately, either or both of intake 9 and output 7 modules may be removed from the system and replaced with different modules that may connect the baking system to additional processing apparatuses in the dough processing line, such as a packing system for the cooked batter in place of output module 7. To further enhance the interchangeability of the inventive system, individual modules of the baking system may be tined to a rack or stand such that individual modules may be attached to the stand or rack at predetermined attachment points designed to mate with attachment points on the modules, and few or no attachment points may exist between the modules themselves. This configuration may also reduce wear and tear from separation and re-connection of modules over time.

It should now be apparent that the above-described baking system 2 and method allows the combination of radiant heating and pressure application, reducing the need for preservatives, ultimately producing a lower calorie low-salt product.

Having now fully set forth the preferred embodiment and certain modifications of the concept underlying the present invention, various other embodiments as well as certain variations and modifications of the embodiments herein shown and described will obviously occur to those skilled in the an upon becoming familiar with said underlying concept. It is to be understood, therefore, that the invention may be practiced otherwise than as specifically set forth in the appended claims.

I claim:

1. A baking system, comprising:
   four modules, including,
   a First Module comprising a frame containing an upper roller 26, and a lower roller 28;
   a Second Module containing an upper roller 24 and a lower roller 22;
   a first continuous thermally-conductive belt passing over said upper rollers 26, 24;
   a second continuous thermally-conductive belt passing over said lower rollers 22, 28;
   a Third Module comprising a first array of radiant heating elements above a lower run of said upper belt between said upper rollers, and;
   a Fourth Module comprising a second array of radiant heating elements below an upper run of said bottom belt between said lower rollers;
   wherein said First, Second, Third and Fourth Modules each comprise their own separate housing and are releasably joined such that they each may be independently removed from the baking system.

2. The baking system of claim 1, wherein said first array of radiant heating elements and said second array of radiant heating are situated directly opposite one another in said Third and Forth Modules.

3. The baking system of claim 1, wherein a portion of said second continuous thermally-conductive belt passing through said first module has a temperature of between 50 and 75 degrees Fahrenheit.

4. The baking system of claim 3, wherein said temperature is between 60 and 70 degrees Fahrenheit.

5. The baking system of claim 1, wherein said first module further comprises a batter deposition means for depositing batter on a top surface of said second continuous thermally-conductive belt.

6. The baking system of claim 5, wherein said batter deposition means is capable of providing a continuous deposition of batter onto a portion of said second continuous thermally-conductive belt passing through said first module.

7. The baking system of claim 1, further comprising means for independent temperature control of individual heating elements in said first and second arrays of heating elements.

8. The baking system of claim 1, wherein the system is mounted such that the facing surfaces of said first and second belts are both parallel to the ground.

9. The baking system of claim 1, further comprising means to adjust a distance between said lower surface of said first belt and a lower surface of said second belt.

10. The baking system of claim 1, wherein said second module contains a connection means for connecting said second belt to a subsequent processing system.

11. A baking system, comprising:
    a first frame containing an upper roller 26, and a lower roller 28;
    a second frame containing an upper roller 24 and a lower roller 22;
    a first continuous thermally-conductive belt passing over said upper rollers 26, 24;
    a second continuous thermally-conductive belt passing over said lower rollers 22, 28;
    a first array of radiant heating elements above a lower run of said upper belt between said upper rollers, and;
    a second array of radiant heating elements below an upper run of said bottom belt between said lower rollers;
    wherein said first and second frames and said first and second arrays of heating elements are each independently connected to a rack.

12. The baking system of claim 11, wherein said first array of radiant heating elements and said second array of radiant heating are situated directly opposite one another.

13. The baking system of claim 11, wherein said first module further comprises a batter deposition means for depositing batter on a deposition area 100 on a top surface of said second continuous thermally-conductive belt.

14. The baking system of claim 1, wherein a deposition area 100 of said second belt has a temperature of between 50 and 75 degrees Fahrenheit.

15. The baking system of claim 14, wherein said temperature is between 60 and 70 degrees Fahrenheit.

16. The baking system of claim 13, wherein said batter deposition means is capable of providing a continuous deposition of batter onto a portion of said second continuous thermally-conductive belt passing through said first module.

17. The baking system of claim 11, further comprising means for independent temperature control of individual heating elements in said first and second arrays of heating elements.

18. The baking system of claim 11, wherein the system is mounted such that the facing surfaces of said first and second belts are both parallel to the ground.

19. The baking system of claim 11, further comprising means to adjust a distance between said lower surface of said first belt and a lower surface of said second belt is adjustable.

20. The baking system of claim 11, wherein said second module contains a connection means for connecting said second belt to a subsequent processing system.

* * * * *